United States Patent [19]

Butler

[11] Patent Number: 4,519,617
[45] Date of Patent: May 28, 1985

[54] CUSHIONING UNIT SHAFT SEAL ARRANGEMENT

[75] Inventor: William S. Butler, Burleson, Tex.

[73] Assignee: Halliburton Company, Duncan, Okla.

[21] Appl. No.: 533,839

[22] Filed: Sep. 19, 1983

[51] Int. Cl.³ .............................................. F16J 15/32
[52] U.S. Cl. ..................................... 277/153; 277/58; 277/125; 277/188 R
[58] Field of Search ................. 277/50, 58, 59, 61–63, 277/123, 125, 138, 152, 153, 165, 167.3, 188 R, 188 A

[56] References Cited

U.S. PATENT DOCUMENTS

| | | |
|---|---|---|
| 2,737,404 | 3/1956 | Lapsley .............................. 277/58 X |
| 2,944,639 | 7/1960 | Blake . |
| 2,944,681 | 7/1960 | Blake . |
| 3,047,162 | 7/1962 | Blake . |
| 3,152,699 | 10/1964 | Vickerman . |
| 3,207,324 | 9/1965 | Blake . |
| 3,233,747 | 2/1966 | Abbott et al. . |
| 3,301,410 | 1/1967 | Seay . |
| 3,434,727 | 3/1969 | Kollenberger ........................ 277/58 |
| 3,451,561 | 6/1969 | Stephenson . |
| 3,463,328 | 8/1969 | Blake . |
| 3,495,719 | 2/1970 | Peppers . |
| 3,568,855 | 3/1971 | Seay et al. . |
| 3,589,527 | 6/1971 | Seay et al. . |
| 3,589,528 | 6/1971 | Stephenson . |
| 3,598,249 | 8/1971 | Vickerman . |
| 3,604,568 | 9/1971 | Dobkins . |
| 3,647,088 | 3/1972 | Seay et al. . |
| 3,726,531 | 4/1973 | Pagan et al. ........................... 277/59 |
| 3,752,329 | 8/1973 | Seay et al. . |
| 3,773,336 | 11/1973 | Walter et al. ...................... 277/58 X |
| 3,791,534 | 2/1974 | Stephenson . |
| 3,854,596 | 12/1974 | Stephenson et al. . |
| 3,854,732 | 12/1974 | Franz et al. ........................... 277/58 |

FOREIGN PATENT DOCUMENTS 937399 9/1963 United Kingdom ................ 277/125

Primary Examiner—Robert S. Ward
Attorney, Agent, or Firm—James R. Duzan; Thomas R. Weaver

[57] ABSTRACT

An improved piston shaft seal assembly and seal arrangement therein for end-of-car hydraulic cushioning units including an improved seal retainer, an improved first oil scraper abutting the improved seal retainer, an improved reinforced oil seal abutting the improved first seal retainer and a second improved oil seal abutting the improved reinforced oil seal. Optionally, the improved piston shaft seal assembly may include an annular spacer.

9 Claims, 6 Drawing Figures

CUSHIONING UNIT SHAFT SEAL ARRANGEMENT

BACKGROUND OF THE INVENTION

This invention relates to an improved piston shaft seal assembly and seal arrangement therein for end-of-car hydraulic cushioning devices.

End-of-car hydraulic cushioning devices which are used to control forces transmitted to a railcar during high velocity impacts are well known in the prior art. Typical examples of such prior art cushioning devices and their components are illustrated in U.S. Pat. Nos. 2,944,639; 2,944,681; 3,047,162; 3,152,699; 3,207,324; 3,233,747; 3,301,410; 3,451,561; 3,463,328; 3,495,719; 3,568,855; 3,589,527; 3,589,528; 3,598,249; 3,604,568; 3,647,088; 3,752,329; 3,791,534; and 3,854,596.

Prior art piston shaft seal assemblies and seal arrangements therein while satisfactory in service each comprise a large number of components making them expensive to manufacture and maintain parts therefore in inventory.

STATEMENT OF THE INVENTION

The present invention is directed to an improved piston shaft seal assembly and seal arrangement therein for end-of-car hydraulic cushioning devices. The improved piston shaft seal assembly comprises an improved seal retainer, a first improved oil scraper seal, an improved reinforced oil scraper seal, and a second improved oil scraper seal. The improved seal arrangement comprises having the first improved oil scraper abutting the improved seal retainer, the improved reinforced oil seal abutting the first improved scraper and the second improved oil seal abutting the improved reinforced oil seal. Optionally, the improved piston shaft seal assembly includes an annular spacer.

BRIEF DESCRIPTION OF THE DRAWINGS

The advantages of the foregoing invention can be better understood when taken in conjunction with the following specification and drawings wherein:

FIG. 6 is an enlarged cross-sectional view of a second embodiment of the present invention of an improved piston shaft seal assembly and improved seal arrangement therein.

DETAILED DESCRIPTION OF THE INVENTION

Figure 1:
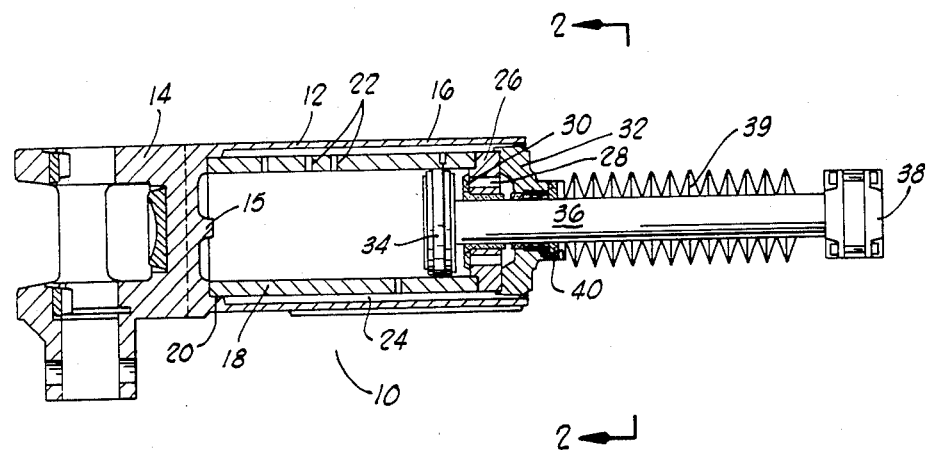
FIG. 1 is a partial cross-sectional view of a typical end-of-car hydraulic cushioning unit utilizing the present invention therein.

Referring to FIG. 1, an end-of-car hydraulic cushioning unit 10 is shown which utilizes the present invention thereon.

The end-of-car hydraulic cushioning unit 10 comprises a housing 12 which includes a coupler portion 14 and tubing portion 16, a cylinder 18 having one end thereof retained within diameter 20 of coupler portion 14 of housing 12 and having a plurality of metering orifices 22 therein for metering the flow of hydraulic fluid from the high pressure interior of the cylinder 18 to the lower pressure annular area 24 formed between the cylinder 18 and tubing portion 16 of the housing 12, cylinder head plate 26 secured to the other end of cylinder 18 having a plurality of apertures 28 therein and spring biased valve means 30 controlling the flow of fluid from the exterior of the cylinder 18 to the interior thereof during buff stroke portions of the cushioning unit cycle, housing end plate 32 secured to one end of the tube portion 16 of the housing 12, piston 34 slidably received within the cylinder 18, piston shaft 36 having one end thereof secured to piston 34 and the remaining portion extending through housing end plate 32, piston shaft end arrangement 38 secured to the other end of the piston shaft 36 and piston shaft seal configuration 40 slidably, sealingly, receiving piston shaft 36 therethrough and secured to the exterior of the housing end plate 32 to retain the seal configuration thereon.

A bellows 39 is secured to the exterior of the housing end plate 32 and the piston shaft 36 to help prevent abrasive material from adhering to the piston shaft 36.

Figure 2:
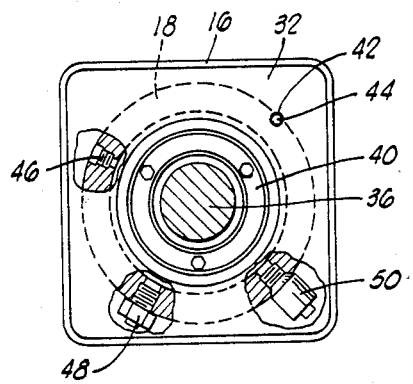
FIG. 2 is a view along line 2—2 of FIG. 1 containing partial cut-away portions to illustrate valving not shown in FIG. 1.

Referring to FIG. 2, the end-of-car hydraulic cushioning unit 10 is shown when viewed along line 2—2 of FIG. 1 with portions of the housing end plate 32 cut away to expose the various valve members in the cylinder 18 to help control the flow of fluid into and therefrom. As shown, the housing end plate 32 includes hydraulic fluid filler hole 42 having filler plug 44 secured therein for filling the unit 10 with hydraulic fluid. As further shown in FIG. 2, the cylinder 18 further includes secured thereto buff and draft pressure relief valves 46, buff end check valve 48 and buff end run-in valves 50 to control the flow of hydraulic oil to and from the cylinder 18 during the buff and draft strokes of the cushioning unit 10.

The buff and draft pressure relief valves 46 are normally closed valves located in each end of the cylinder 18. The valves 46 are designed to open under a predetermined pressure within the cylinder to retain the hydraulic stroke of the piston 34 in the extreme ends of the cylinder 18 of the unit 10 for extended periods of time.

The buff end check valve 48 is a normally closed valve located in the buff end of the cylinder 18; i.e., the end of the cylinder 18 connected to coupler portion 14 of housing 12. The buff end check valve opens during any extension of the cushioning unit 10 to allow hydraulic oil to flow to the low pressure side of the piston.

The buff end run-in valves 50 are normally open valves located near the buff end of the cylinder 18. However, during impact, the buff end run-in valves 50 are locked in the open position while during train run-in, the valves 50 close and restrict hydraulic fluid flow from the cylinder 18.

Figure 3:
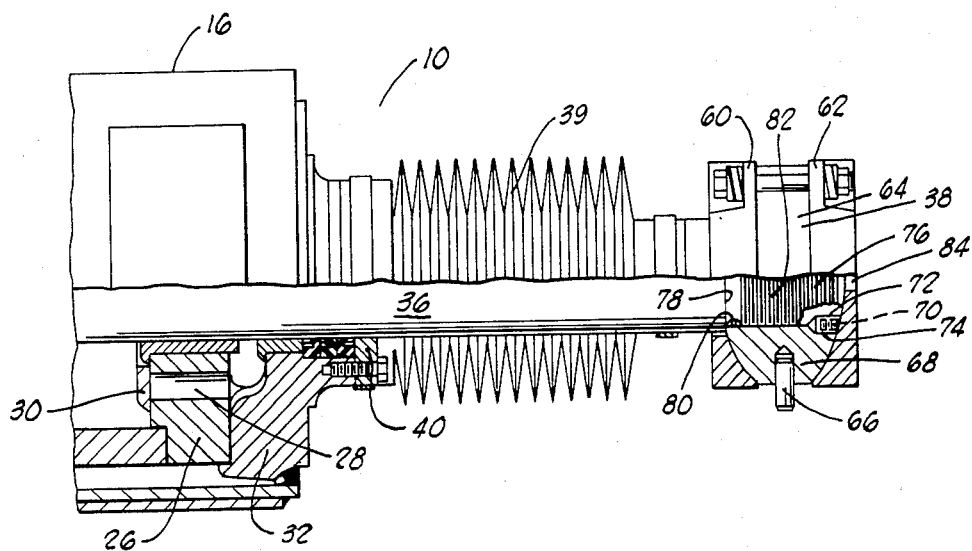
FIG. 3 is an enlarged partial cross-sectional view of a portion of the cushioning unit of FIG. 1.

Referring to FIG. 3, a portion of the end-of-car hydraulic cushioning unit 10 is shown in partial cross-section. As shown, the piston shaft end arrangement 38 comprises front radius plate 60, rear radius plate 62, piston shaft ball 64 threadedly secured to one end of the piston shaft 36, antirotation pin 66 received in aperture 68 and retained therein, and locking pin 70 retained by means of a friction fit within a bore 72 formed by a portion of the end of the piston shaft 36 and a portion of the piston shaft ball 64.

The end 76 of the piston shaft 36 is formed having an annular shoulder 78, under cut radius portion 80, threaded portion 82 and spherical end surface 84.

Figure 4:
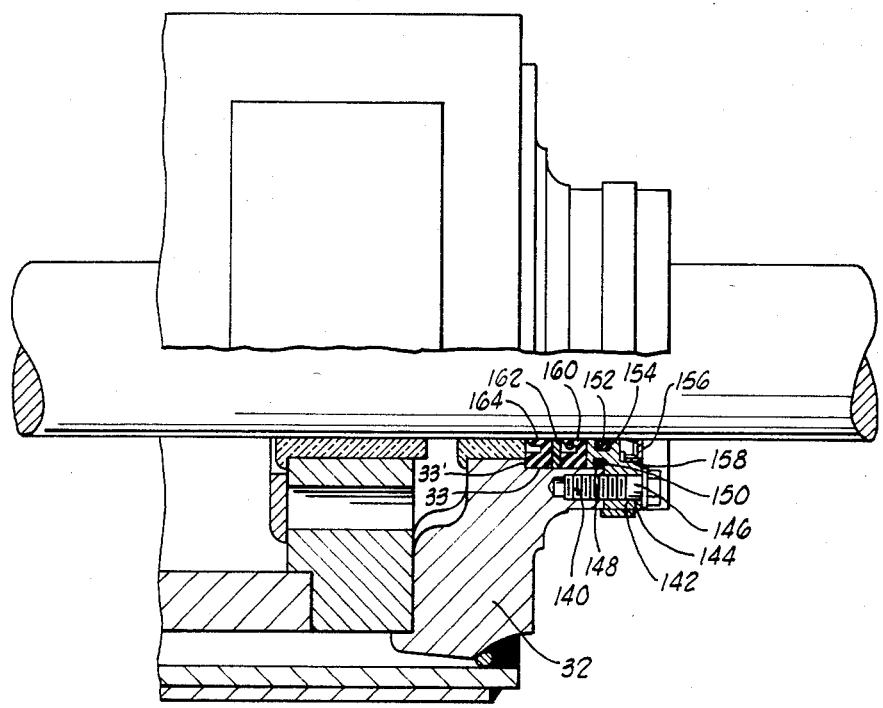
FIG. 4 is an enlarged cross-sectional view of the prior art piston shaft seal assembly and seal arrangement.

Referring to FIG. 4, the prior art piston shaft seal assembly 140 and seal arrangement therein is shown. The prior art piston shaft seal assembly 140 comprises a seal retainer 142 having, in turn, a plurality of apertures 144 therein through which threaded fasteners 146 extend into threaded apertures in housing end plate 32, a outer O-ring seal 148 retained in annular recess 150 in seal retainer 142, inner O-ring 152 retained within annular recess 154 in seal retainer 142, annular piston shaft scraper ring 156 retained within annular recess 158 in seal retainer 142, annular reinforced oil seal 160 retained within annular recess 33 of housing endplate 32, annular oil seal spacer 162 retained within annular recess 33 of housing endplate 32 abutting annular reinforced oil seal 160 and annular resilient oil seal 164 retained within annular recess 33 of housing endplate 32 abutting annular oil seal spacer 162 and annular shoulder 33' of annular recess 33 in housing endplate 32.

The prior art piston shaft seal assembly 140 comprises a total of eight (8) component parts of which there are three different types of seals, a spacer and two different sizes of O-ring seals.

Figure 5:
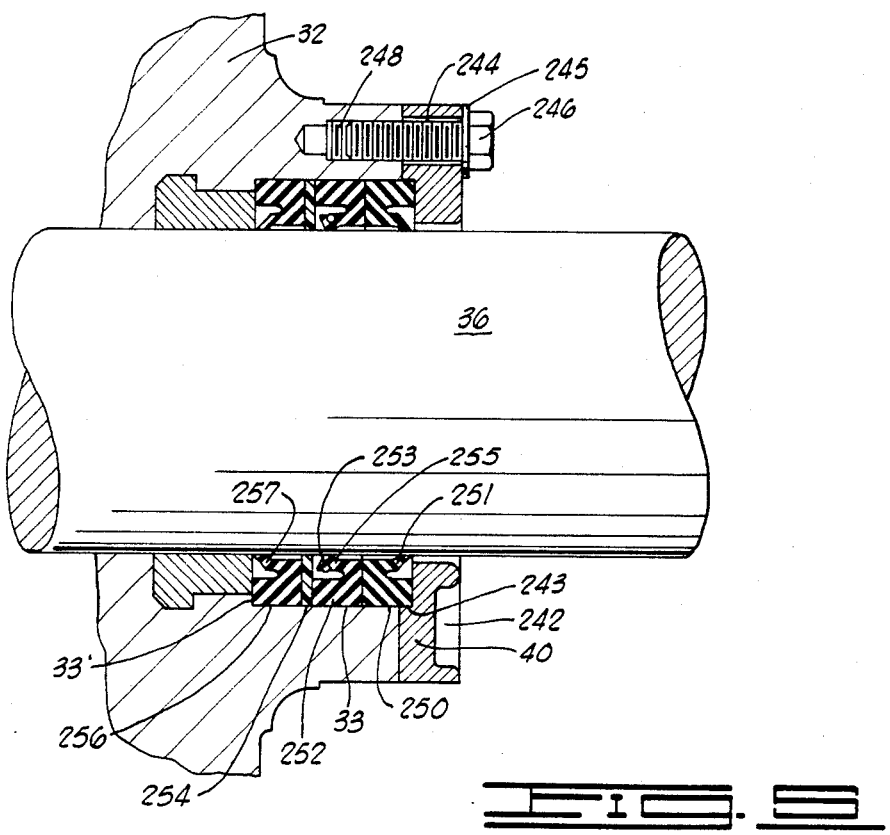
FIG. 5 is an enlarged cross-sectional view of a first embodiment of the present invention of an improved piston shaft seal assembly and improved seal arrangement therein.
Figure 8:
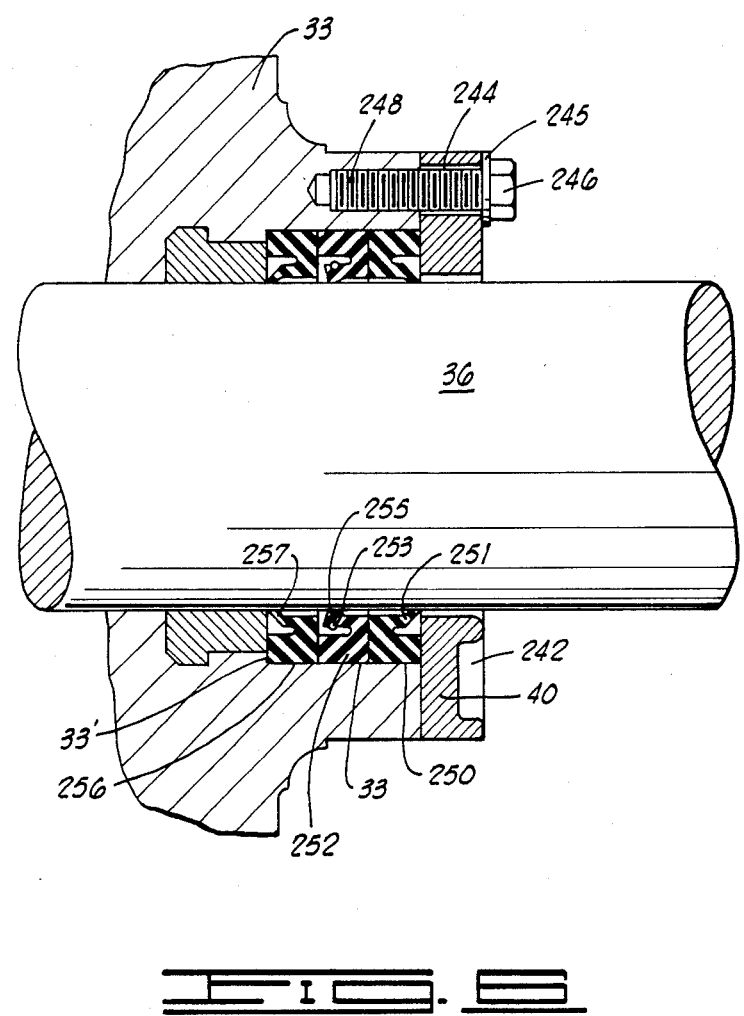

Referring to FIG. 5, the improved piston shaft seal assembly 40 and improved seal arrangement therein of the present invention is shown.

An improved piston shaft seal assembly 40 comprises annular seal retainer 242 having a bore therethrough and a plurality of apertures 244 therethrough having, in turn, a plurality of threaded fasteners 246, each fastener having a washer 245 thereunder, extending therethrough engaging threaded apertures 248 in housing endplate 32, first annular oil scraper seal 250 being retained within annular recess 33 in housing endplate 32 having a portion retained abuttingly within annular recess 243 of seal retainer 242, reinforced annular oil scraper seal 252 being retained within annular recess 33 of housing endplate 32, having an annular coil type spring 253 biasing the lip 255 of the seal 252 into engagement with the piston shaft 36, and abutting first annular oil scraper seal 250, an optional annular spacer 254 retained within recess 33 of housing endplate 32 abutting reinforced annular oil scraper seal 252, and second annular oil scraper seal 256 being retained within annular recess 33 in housing endplate 32 abutting annular spacer 254 and shoulder 33' of recess 33 in housing endplate 32.

Referring to FIG. 6, a second improved piston shaft seal assembly 40 and the preferred embodiment of the improved seal arrangement therein of the present invention is shown.

The improved piston shaft seal assembly 40 comprises annular seal retainer 242 having a bore therethrough and a plurality of apertures 244 therethrough having, in turn, a plurality of threaded fasteners 246, each fastener having a washer 245 thereunder, extending therethrough engaging threaded apertures 248 in housing endplate 32, first annular oil scraper seal 250 being retained within annular recess 33 in housing endplate 32 having a portion retained abutting seal retainer 242, reinforced annular oil scraper seal 252 being retained within annular recess 33 of housing endplate 32 having, in turn, an annular coil type spring 253 biasing the lip 255 of the seal 252 into engagement with the piston shaft 36 and abutting first annular oil scraper seal 250, and second annular oil scraper seal 256 being retained within annular recess 33 in housing endplate 32 abutting reinforced annular oil scraper seal 252 and shoulder 33' of recess 33 in housing endplate 32.

In the present invention of the improved piston shaft seal assembly 40, although reference in the detailed description of the invention has been made to a first annular oil scraper seal 250 and second annular oil scraper seal 256, the seals 250 and 256 are of substantially identical construction and are merely installed in recess 33 in housing endplate 32 having the annular scraper lips thereof 251 and 257 respectively extending in opposite directions with respect to the piston shaft 36.

The improved piston shaft seal assembly 40 of the present invention comprises only a maximum six (6) components of which there are only two (2) different types of annular oil scraper seals.

In contrast to the prior art oil seal assembly 140, the present invention costs less to manufacture and install. Also, by utilizing the same type of annular oil scraper seal in different locations within the seal arrangement, the arrangement is improved and fewer seals must be maintained in inventory.

Having thus described my invention, I claim:

1. A piston shaft seal assembly for an end-of-car hydraulic cushioning unit having a housing and a piston shaft extending therefrom, said piston shaft seal assembly comprising:

an annular seal retainer; a first continuous substantially elastomeric annular oil scraper seal having a scraper lip thereon sealingly engaging said piston shaft and extending in one direction therealong, the first annular oil scraper seal having a portion thereof abutting a portion of the annular seal retainer;

a reinforced continuous substantially elastomeric annular oil scraper seal having a scraper lip thereon sealingly engaging said piston shaft and extending in another direction therealong, the scraper lip including an annular coil spring biasing means to bias the scraper lip of the seal into sealing engagement with said piston shaft, the reinforced annular oil scraper seal having a portion thereof abutting a portion of the first annular oil scraper seal; and a second continuous substantially elastomeric annular oil scraper seal having a scraper lip thereon sealingly said piston shaft and extending in said another direction therealong.

2. The piston shaft seal assembly of claim 1 wherein said piston shaft seal assembly further comprising:

an annular spacer having a portion thereof abutting a portion of the reinforced annular oil scraper seal and a portion of the second annular oil scraper seal.

3. The piston shaft seal assembly of claim 2 wherein the annular seal retainer includes a plurality of apertures therein and an annular recess in which a portion of the first annular oil scraper seal is retained.

4. The piston shaft seal assembly of claim 3 wherein the first annular oil scraper seal and the second annular oil scraper seal are of substantially identical construction.

5. The piston shaft seal assembly of claim 4 further comprising:

a plurality of threaded fasteners extending through the plurality of apertures in the seal retainer being secured to said housing to retain said piston shaft seal assembly to said housing.

6. The piston shaft seal assembly of claim 1 wherein the annular seal retainer includes a plurality of apertures therein.

7. The piston shaft seal assembly of claim 6 wherein the first annular oil scraper seal and the second annular oil scraper seal are of substantially identical construction.

8. The piston shaft seal assembly of claim 7 further comprising:
a plurality of threaded fasteners extending through the plurality of apertures in the seal retainer being secured to said housing to retain said piston shaft seal assembly to said housing.

9. A piston shaft seal assembly for an end-of-car hydraulic cushioning unit having a housing and a piston shaft extending therefrom, said piston shaft seal assembly comprising:
an annular seal retainer having a plurality of apertures therein;
a first continuous substantially elastomeric annular oil scraper seal having a scraper lip thereon sealingly engaging said piston shaft and extending in one direction therealong, the first annular oil scraper seal having a portion thereof abutting a portion of the annular recess in the annular seal retainer;
a reinforced continuous substantially elastomeric annular oil scraper seal having a scraper lip thereon sealingly engaging said piston shaft and extending in another direction therealong, the scraper lip including an annular coil spring biasing means to bias the scraper lip of the seal into sealing engagement with said piston shaft, the reinforced annular oil scraper seal having a portion thereof abutting a portion of the first annular oil scraper seal; and
a second continuous substantially elastomeric annular oil scraper seal having a scraper lip thereon sealingly engaging said piston shaft and extending in said another direction therealong, the second annular oil scraper seal being of substantially identical construction to the first annular oil scraper seal.

* * * * *